3,408,330
POLYMERIZATION OF 3,4-DIHYDRO-2H-PYRAN-2-CARBOXALDEHYDE

Eugene S. Barabas, Watchung, and John Manson, New Providence, N.J., assignors to Air Reduction Company, Incorporated, New York, N.Y.
No Drawing. Filed Sept. 4, 1962, Ser. No. 221,372
16 Claims. (Cl. 260—67)

This invention relates to processes for polymerizing 3,4-dihydro-2H-pyran-2-carboxaldehyde.

Linear polymers made according to this invention have the repeating monomer group

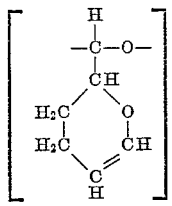

Cross-linked polymers in which cross-linking occurs through the double bond can also be made.

According to this invention 3,4-dihydro-2H-pyran-2-carboxaldehyde is polymerized in a homogeneous system, either in bulk or a suitable organic solvent, at a temperature of $-20°$ to $-90°$ C., using either an aluminum trialkyl or an acid-reacting inorganic halide as the catalyst. Preferred polymerization temperatures are in the range of $-40°$ to $-80°$ C.

Various organic solvents can be used for carrying out the polymerization. Hydrocarbons such as hexane, heptane, and benzene; chlorinated hydrocarbons such as chloroform and carbon tetrachloride; and ethers such as tetrahydrofuran, are among the suitable solvents.

The aluminum trialkyl catalysts may be represented by the formula $AlR_3$, where R is a lower alkyl radical containing from one to about five carbon atoms. Typical aluminum trialkyl catalysts are aluminum triethyl and aluminum triisobutyl. The acid reacting catalysts are the Friedel-Crafts catalysts which are known free radical initiators, such as boron trifluoride, boron trifluoride etherate, aluminum chloride, zinc chloride, and the like.

The linear polymers made according to the invention are soluble in common organic solvents such as benzene, toluene, chlorine, ethyl acetate, acetone, and dimethylformamide. These polymers are insoluble in water. Cross-linked polymers are either insoluble or partially soluble in organic solvents, depending on the degree of cross-linkage.

The polymers of this invention can be used in the manufacture of hard, infusable cross-linked resins. Cross-linking can occur through the double bond. These polymers may be hydrolyzed to form the corresponding aldehydes which can then be cross-linked. The polymers produced according to this invention may also be used as surface active agents in nonaqueous media.

This invention will now be described in detail with reference to the examples which follow.

Example 1

50 ml. of 3,4-dihydro-2H-pyran-2-carboxaldehyde, 50 ml. of hexane, and 0.5 g. of a 60% solution of aluminum triethyl in hexane were charged to a polymerization reactor under a nitrogen atmosphere at $-78°$ C. The reactor was maintained at this temperature with stirring for 100 hours. At the end of this time, the reaction was quenched, the reaction product removed, the liquid evaporated and a solid polymer recovered. Yield 34.0 g.

The solid polymer which was white and waxy, was cut into small pieces and extracted with 200 ml. of acetone. Part of the polymer went into solution. The presence of both acetone-soluble and acetone-insoluble portions suggested that the polymer was partially cross-linked. The acetone soluble fraction was precipitated from hexane. The acetone-insoluble portion was extracted with 200 ml. of benzene, giving 5.8 g. of polymer after evaporation of the solvent. This polymer was purified by dissolving again in benzene and precipitating a fraction from hexane. The hexane was evaporated to obtain a third, hexane-soluble fraction weighing 2.1 g. This fraction was vacuum dried.

Example 2

The polymerization procedure of Example 1 was followed, except that 1 ml. of 60% solution of aluminum triethyl in hexane was used in the catalyst, and the reaction time was 48 hours. The liquid in the reaction product was evaporated, leaving a polymer which was vacuum dried. The crude polymer was extracted with chloroform, yielding soluble and insoluble portions, both of which showed microcrystalline structures. Yield 48.0 g. (95%).

Example 3

The procedure of Example 1 was followed except that the catalyst consisted of 3 mm. of a 25% solution of aluminum triisobutyl in heptane, and the reaction time was 70 hours. The reaction mixture was quenched with methanol, allowed to warm to room temperature, placed in a dish, and the liquid evaporated. The crude solid polymer obtained was extracted with chloroform yielding both soluble and insoluble portions. Both portions were dried. Yield 27.8 g. (52%).

Example 4

30 ml. of 3,4-dihydro-2H-pyran-2-carboxaldehyde, 60 ml. of hexane, and 2 ml. of a 2% solution of boron trifluoride diethyl ether complex were charged to a polymerization reactor under a nitrogen atmosphere at $-78°$ C. This temperature was maintained through polymerization. The mixture was stirred initially, but stirring was soon stopped because of the solidification in the reactor. After 60 hours the reaction was quenched by the addition of 1 ml. of methanol. The reaction mixture was warmed to room temperature melting the solid, and the melted mixture was poured into water. The polymers separated very slowly, and showed very strong surface activity. The polymer was dissolved in benzene and the solution dried. The liquid was filtered, evaporated under nitrogen, and the solid product vacuum dried. Yield 16.0 g.

Example 5

30 g. of 3,4-dihydro-2H-pyran-2-carboxaldehyde, 70 ml. of chloroform and 2 ml. of a 2% solution of boron trifluoride-diethyl ether complex in chloroform were charged to a polymerization reactor under a nitrogen atmosphere at $-78°$ C. Polymerization was carried out at $-78°$ C. for about 3 days. The reaction mixture was quenched and the polymer recovered by evaporation of the solvent. This polymer was readily soluble in organic solvents and had a low molecular weight.

What is claimed is:

1. A process which comprises homoplymerizing 3,4-dihydro-2H-pyran-2-carboxaldehyde in a homogeneous system in the presence of a catalyst selected from the group consisting of aluminum trialkyls and acid-reacting inorganic halides at a temperature of about $-20°$ to $-90°$ C., said aluminum trialkyls having the formula $AlR_3$, wherein R is a lower alkyl radical containing from 1 to 5 carbon atoms, and said halides being Friedel-Crafts catalysts.

2. A process according to claim 1 wherein the temperature is −40° to −80° C.

3. A process according to claim 1 wherein polymerization is carried out in an inert atmosphere.

4. A process according to claim 1 wherein polymerization is carried out in an organic solvent medium.

5. A process as defined in claim 1, wherein said Friedel-Crafts catalysts are selected from the group consisting of boron trifluoride, boron trifluoride etherate, aluminum chloride, and zinc chloride.

6. A process as defined in claim 3, wherein said inert atmosphere is an atmosphere of nitrogen.

7. A process as defined in claim 4, wherein said organic solvent medium is selected from the group consisting of hydrocarbons, chlorinated hydrocarbons, and ethers.

8. A process which comprises homopolymerizing 3,4-dihydro-2H-pyran-2-carboxaldehyde in a homogeneous system in the presence of an aluminum trialkyl having the formula $AlR_3$, wherein R is a lower alkyl radical containing from 1 to 5 carbon atoms, at a temperature of about −20° to −90° C.

9. A process according to claim 8, wherein the temperature is −40° to −80° C.

10. A process according to claim 8, wherein polymerization is carried out in an inert atmosphere.

11. A process according to claim 8, wherein polymerization is carried out in an organic solvent medium.

12. A process as defined in claim 10, wherein said inert atmosphere is an atmosphere of nitrogen.

13. A process as defined in claim 11, wherein said organic solvent medium is selected from the group consisting of hydrocarbons, chlorinated hydrocarbons, and ethers.

14. A process which comprises homopolymerizing a monomer consisting essentially of 3,4-dihydro-2H-pyran-2-carboxaldehyde in a homogeneous system in the presence of a catalyst selected from the group consisting of aluminum trialkyls and acid-reacting inorganic halides at a temperature of about −20° to −90° C., said aluminum trialkyls having the formula $AlR_3$, wherein R is a lower alkyl radical containing from 1 to 5 carbon atoms, and said halides being Friedel-Crafts catalysts, polymerization being carried out in an atmosphere of nitrogen and in an organic solvent medium selected from the group consisting of hydrocarbons, chlorinated hydrocarbons, and ethers.

15. A process which comprises homopolymerizing 3,4-dihydro-2H-pyran-2-carboxaldehyde in a homogeneous system in the presence of an aluminum trialkyl having the formula $AlR_3$, wherein R is a lower alkyl radical containing from 1 to 5 carbon atoms, at a temperature of about −20° to −90° C., polymerization being carried out in an atmosphere of nitrogen and in an organic solvent medium selected from the group consisting of hydrocarbons, chlorinated hydrocarbons, and ethers.

16. A process which comprises homopolymerizing 3,4-dihydro-2H-pyran-2-carboxaldehyde, as the sole reactant, in the presence of a catalyst selected from the group consisting of boron trifluoride, boron trifluoride-etherate, aluminum chloride, zinc chloride and aluminum alkyls of the formula $AlR_3$ wherein R is alkyl group of one to four carbon atoms, at a temperature of from about −20° C. to about −90° C.

References Cited

UNITED STATES PATENTS

| | | | |
|---|---|---|---|
| 2,514,172 | 7/1950 | Whetstone et al. | 260—67 |
| 2,537,921 | 1/1951 | Smith et al. | 260—88.3 |
| 2,640,815 | 6/1953 | Whetstone et al. | 260—67 |
| 2,895,922 | 7/1959 | Goddu | 260—2 |

WILLIAM H. SHORT, *Primary Examiner.*

H. D. ANDERSON, L. M. MILLER,
*Assistant Examiners.*

UNITED STATES PATENT OFFICE
CERTIFICATE OF CORRECTION

Patent No. 3,408,330                                                      October 29, 1968

Eugene S. Barabas et al.

It is certified that error appears in the above identified patent and that said Letters Patent are hereby corrected as shown below:

Column 1, line 42, cancel "free radical".

Signed and sealed this 31st day of March 1970.

(SEAL)
Attest:

Edward M. Fletcher, Jr.                           WILLIAM E. SCHUYLER, JR.
Attesting Officer                                          Commissioner of Patents